United States Patent [19]

Hatta et al.

[11] Patent Number: 5,943,343
[45] Date of Patent: Aug. 24, 1999

[54] SPEECH AND DATA COMPRESSION METHOD AND APPARATUS

[75] Inventors: Tomoaki Hatta, Fujisawa; Kazuhisa Yoshimura; Ryohji Takahashi, both of Yamato, all of Japan

[73] Assignee: International Business Machines Corporation, Armonk, N.Y.

[21] Appl. No.: 08/751,598

[22] Filed: Nov. 18, 1996

[30] Foreign Application Priority Data

Nov. 22, 1995 [JP] Japan ..................................... 7-304172

[51] Int. Cl.⁶ ......................................................... H04J 3/16
[52] U.S. Cl. ............................................................. 370/468
[58] Field of Search ................................... 370/468, 477, 370/202, 252, 465, 498, 535, 537, 545

[56] References Cited

U.S. PATENT DOCUMENTS

| | | | |
|---|---|---|---|
| 5,115,429 | 5/1992 | Hluchyj | 370/468 |
| 5,444,707 | 8/1995 | Cerna et al. | 370/468 |
| 5,546,395 | 8/1996 | Sharma | 370/468 |
| 5,555,377 | 9/1996 | Christensen et al. | 370/468 |
| 5,742,734 | 4/1998 | DeJaco | 395/2.35 |

*Primary Examiner*—Huy D. Vu
*Attorney, Agent, or Firm*—Jeanine S. Ray-Yarletts

[57] ABSTRACT

Systems and methods are provided for effectively using a trunk line in a speech compression system by dynamically selecting or changing the trunk line based on a band use rate. Then the line usage is equal to or greater than a threshold value, a currently connected call is switched to a compression method which requires less bandwidth. A switch enabling attribute is set for each can and a switch enabled call is selected as a target for switching and a transmission side and a reception side acquire the resources that are needed for use of compression after switching. When the acquisition of the resources is successful, a data transfer is performed for the currently connected resources and the newly acquired resources. After the data transfer, both resources are synchronized and the resource that was used by the call are released.

12 Claims, 8 Drawing Sheets

|  | TERMINAL INTERFACE 222 | TRUNK INTERFACE 224 | DSP CHANNEL 226 | INTER-CONNECT 228 |
|---|---|---|---|---|
| CONNECTION A 232 | CH - 3 | CH - β | CH - N | CH - A |
| CONNECTION B 234 | CH - 9 | CH - γ | CH - Ω | CH - B |
| CONNECTION C 236 | CH - 1 | CH - ρ | CH - M | CH - C |

FIG. 10

| DSP - 1 242 | CH - 1 252 | 16KB USED (CONNECTION A) |
|---|---|---|
|  | CH - 2 254 | UNUSED |
| DSP - 2 244 | CH - 1 256 | UNUSED |
|  | CH - 2 258 | 32KB USED (CONNECTION B) |
| DSP - 3 246 | CH - 1 260 | UNUSED |
|  | CH - 2 262 | 16KB USED (CONNECTION C) |

SPEECH AND DATA COMPRESSION METHOD AND APPARATUS

FIELD OF THE INVENTION

The present invention relates to a data communication method that includes speech data and an apparatus therefor; and specifically, to a communication method for dynamically changing a compression system and an apparatus therefor. More specifically, the present invention pertains to a communication method by which a plurality of speech compression systems are provided for a communication apparatus that handles synchronous or asynchronous speech, and are dynamically selected regardless of a currently connected call or a new call, so as to dynamically optimize the efficiency in the use of trunk lines, and an apparatus therefor.

BACKGROUND OF THE INVENTION

A special line is employed as a trunk line for a conventional time division multiplexer (TDM). For transmission of speech, a countermeasure is taken whereby compression of speech is performed to reduce the width of the bands in a trunk line, so that the number of lines contained increases. Various speech compression methods are available and are selected by taking compression rate and speech quality into consideration. Currently, the following speech methods are considered methods for selection. PCM transfer in which compression is not performed is also listed.

| Compression Method | Communication Speed | Compression Rate | Compression Effect Scale | Speech Quality |
|---|---|---|---|---|
| 1. PCM | 64 Kb/s | 1 | 1.0 | 1.0 |
| 2. ADPCM | 32 Kb/s | 2 | 0.5 | 0.8 |
| 3. LDCELP | 16 Kb/s | 4 | 0.25 | 0.7 |
| 4. VSELP | 8 Kb/s | 8 | 0.125 | 0.6 |

In the background, however, since a method is used whereby a speech compression system is selected each time a call occurs, the following problems will arise:
1. When a speech line is to be set, the empty capacity of a trunk is taken into consideration and an optimal compression system is selected to ensure a necessary band.
2. If there is no empty space in the trunk, a line can not be acquired relative to a request for a call, and a call loss occurs.
3. When a line is used for only a high compression system, speech quality is always poor and does not satisfy a user.

Disclosed in Japanese Patent Application No. Sho 62-160899 is a trunk line selection method by which, in a time-division speech compression system that can select a plurality of speech compression methods, when a trunk line for selected speech quality (compression system) is being used, a trunk line for a higher speech quality (compression system) is employed. This trunk line selection method is, however, a method for selecting one of a plurality of compressed speech qualities relative to a generated call, and as the currently connected calls are dynamically re-connected, it is impossible to effectively utilize the band of a line by switching the selected compressed speech quality, and to avoid a call loss relative to a new call. When there is no empty space in the trunk line, a line band can not be ensured for a dialing request, and a call loss will occur.

Disclosed in Japanese Patent Application No. Sho 62-143531 are a compound communication system, which includes speech information, data information and frame information, that sets a compression rate for speech information so that the communication capacities of the speech information, the data information, and the frame information are the maximum channel capacities. However, this background does not teach the dynamic re-connection of a currently connected call, and when all the trunk lines are being used by the compression system of a higher speech quality, it is impossible to switch the compressed speech quality for effective use of the band width of a line and to avoid a call loss relative to a new call.

OBJECTS OF THE INVENTION

It is one object to switch compressed speech quality by dynamic re-connection of a currently connected call, to dynamically optimize the efficiency in the use of trunk lines, and to avoid a call loss relative to a new call.

SUMMARY OF THE INVENTION

A compression system of high speech quality is employed within the capacity of the band of a trunk line, and when a band becomes insufficient, or when a predetermined threshold value is reached, the system is switched to that of a higher compression rate, and a band for a request for a new call is ensured. To easily understand the present invention, an explanation will be given by using only speech data; however, according to the idea of the present invention, text data and image data, in addition to speech data, are included, and the present invention can be applied for not only a time division multiplexing system but also a frequency division method such as a trunk line transfer method. Furthermore, the present invention can be used for radio communication and optical communication. And, the present invention can be applied to not only a synchronous multiplexer, such as a TDM, but also to an asynchronous multiplexer, such as an ATM, that performs packet multiplexing and cell multiplexing.

According to one aspect of the present invention, a communication method comprises: a step of, in response to a request for a change in a compression rate, connecting a new call at a compression rate that is different from that of a currently connected call; and a step of communicating for a new call the same data as that of the currently connected call. The step of, in response to a request for a change of a compression rate, connecting a new call at a compression rate that is different from that of a currently connected call, includes a step of disconnecting the currently connected call and connecting the new call, and a step of connecting the new call in parallel with the currently connected call.

According to another aspect of the present invention, a medium comprises: program code means for, in response to a request for a change in a compression rate, instructing a communication apparatus to connect a new call at a compression rate that is different from that of a currently connected call; program code means for instructing the communication apparatus to communicate for a new call the same data as that for the currently connected call; program code means for instructing the communication apparatus to release a resource that is employed for the currently connected call; and program means for controlling the communication apparatus by using two or more different compression rates.

According to an additional aspect of the present invention, a communication method comprises: a step of determining a current line usage; a step of, when the current line usage reaches a predetermined range, selecting a currently connected call with a first compression rate; a step of determining whether or not a call with a second compression rate can be newly connected; a step of, when it is ascertained that the call with the second compression rate can be connected, connecting the call at the second compression rate; a step of communicating, for the call with the second compression rate, the same data as that for the call at the first compression rate; and a step of disconnecting the call with the first compression rate.

According to a further aspect of the present invention, a communication method comprises a step of transmitting a call at a first terminal; a step of detecting transmission of the call; a step of checking the current line usage; a step of, when the current line usage reaches a predetermined range, selecting a currently connected call with the first compression rate at a second terminal; a step of examining a resource management table to determine whether or not it is possible to acquire on a transmission side a DSP channel, a trunk band and an interconnect band, which are required for connecting a new call at a second compression rate; a step of transmitting a resource acquisition request to a reception side in order to connect a call at the second compression rate; a step of detecting a resource acquisition notice from the reception side; a step of, when it is ascertained that a call can be connected to the transmission side and the resource acquisition notice is detected, connecting a call at the second compression rate; a step of communicating, for the call with the second compression rate, the same data as that for the call with the first compression rate; a step of establishing synchronization for the call with the second compression rate; and a step of cutting off the call with the first compression rate and releasing a DSP channel, a trunk band and an interconnect band that are used for the call with the first compression rate. The terminals above include a terminal device, a telephone set, and a facsimile machine.

According to still another aspect of the present invention, with a communication method, when the current line usage is smaller than a first threshold value, a required band for a second compression rate can be set wider than that for a first compression rate. When the current line usage is greater than a second threshold value, which is greater than the first threshold value, the required band for the second compression rate can be set smaller than that for the first compression rate.

According to a still further aspect, in a communication method, the condition wherein an attribute of a call with the first compression rate, having a greater value than that of the second compression rate must be established to perform a step of selecting a call with a first compression rate.

According to yet another aspect of the present invention, with a communication method, a time division multiplexer can allocate bands as a speech band for performing speech communication, a data band for performing data communication, and a monitor control channel for performing communication of control information with another time division multiplexer. Further, the number of lines in the data band can be examined at the step of checking the current line usage, and a line in the speech band currently connected can be selected at the step of selecting a currently connected call with the first compression rate.

A communication system according to the present invention comprises: means for, in response to a request for a change in a compression rate, connecting a new call at a compression rate that is different from that of a currently connected call; and means for communicating for a new call the same data as that for the currently connected call. The means for, in response to a request for a change in a compression rate, connecting a new call at a compress ion rate that is different from that for a currently connected call, includes means for disconnecting the currently connected call and connecting a new call, and means for connecting a new call in parallel with the currently connected call.

According to another aspect of the present invention, a communication system comprises: means for checking the current line usage; means for, when the current line usage reaches a predetermined range, selecting a currently connected call with a first compression rate; means for determining whether or not a call with a second compression rate can be newly connected; means for, when it is ascertained that the call with the second compression rate can be connected, connecting the call at the second compression rate; means for communicating, for the call with the second compression rate, the same data as that for the call at the first compression rate; and means for disconnecting the call with the first compression rate.

According to an additional aspect of the present invention, a communication system comprises: a first terminal for transmitting a call; a terminal interface for detecting transmission of a call; means for checking the current line usage; means for, when the current line usage reaches a predetermined range, selecting a currently connected call with the first compression rate at a second terminal; means for examining a resource management table to determine whether or not it is possible to acquire on a transmission side a DSP channel, a trunk band and an interconnect band, which are required for connecting a new call at a second compression rate; means for transmitting a resource acquisition request to a reception side in order to connect a call at the second compression rate; means for detecting a resource acquisition notice from the reception side; means for, when it is ascertained that a call can be connected to the transmission side and the resource acquisition notice is detected, connecting a call at the second compression rate; means for communicating, for the call with the second compression rate, the same data as that for the call with the first compression rate; means for establishing synchronization for the call with the second compression rate; and means for cutting off the call with the first compression rate and releasing a DSP channel, a trunk band and an interconnect band that are being used for the call with the first compression rate.

According to a further aspect of the present invention, in a communication system, when the current line usage is smaller than a first threshold value, a required band for a second compression rate can be wider than that for a first compression rate. When the current line usage is greater than a second threshold value, which is greater than the first threshold value, the required band for the second compression rate can be set smaller than that for the first compression rate.

According to still another aspect, in a communication system, the condition wherein an attribute, of a call with the first compression rate, for permitting a compression rate that has a greater value than that of the second compression rate must be provided for the means for selecting a call with a first compression rate.

According to a still further aspect of the present invention, in a communication system, a time division multiplexer can allocate bands as a speech band for performing speech communication, a data band for performing data communication, and a monitor control channel for performing communication of control information with another time division multiplexer. Further, the means for checking the current line usage can also examine the number of lines in the data band, and the means for selecting a currently connected call with the first compression rate can select a line in the speech band that is currently connected.

According to yet another aspect of the present invention, a time division multiplexer comprises: means for detecting a resource acquisition request, which is transmitted from a transmission side, that is required for connecting a new call at a compression rate that is different from that for a currently connected call; means for, in response to the resource acquisition request, determining whether or not a resource can be acquired, which is necessary for connecting a new call at a second compression rate; means for, when it is ascertained that the resource can be acquired, transmitting a resource acquisition notice to the transmission side; means for connecting a call at a compression rate that is different from that for the currently connected call; and means for receiving the same data as that for the currently connected call for a call that has a different compression rate from the currently connected call.

According to yet an additional aspect of the present invention, a communication system comprises: means for examining the current line usage; means for, when the current line usage reaches a predetermined range, selecting a currently connected call with the first compression rate; means for transmitting from a transmission side to a reception side a signal indicating that the call with the first compression rate is to be changed to a call with a second compression rate; means for disconnecting a call with the first compression rate; and means for connecting a call at the second compression rate, whereby the disconnection, between the transmission side and the reception side, of the call with the first compression rate and the connection of the call with the second compression rate can be performed with a time difference, due to a line delay between the transmission side and the reception side, and with a real time clock difference between the transmission side and the reception side.

DETAILED DESCRIPTION OF THE PREFERRED EMBODIMENT

Figure 1:
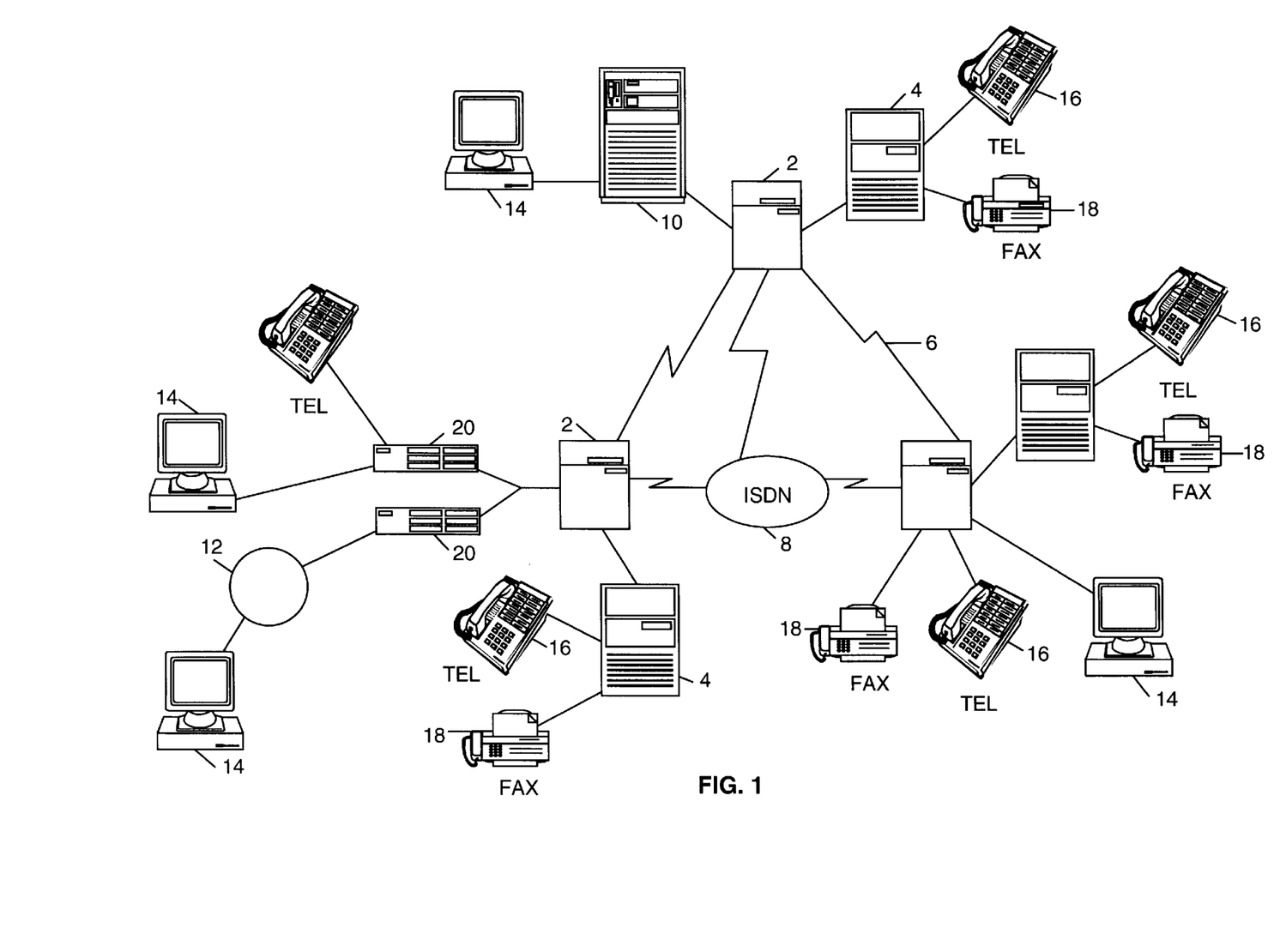
FIG. 1 is a diagram illustrating one embodiment of a communication system of the present invention.

FIG. 1 is a diagram illustrating one embodiment of a communication system 100 according to the present invention. The communication system 100 includes time division multiplexers 2, which are mutually connected by a high speed digital line 6 and an ISDN 8. A PBX 4 and a host computer 10 are connected to each of the time division multiplexers 2, and a terminal 14, a telephone set 16, and a facsimile machine (FAX) 18 are connected directly or via the PBX 4. A LAN 12, to which is connected the terminal 14, is connected to the time division multiplexer 2 via one of routers 20.

Figure 8:
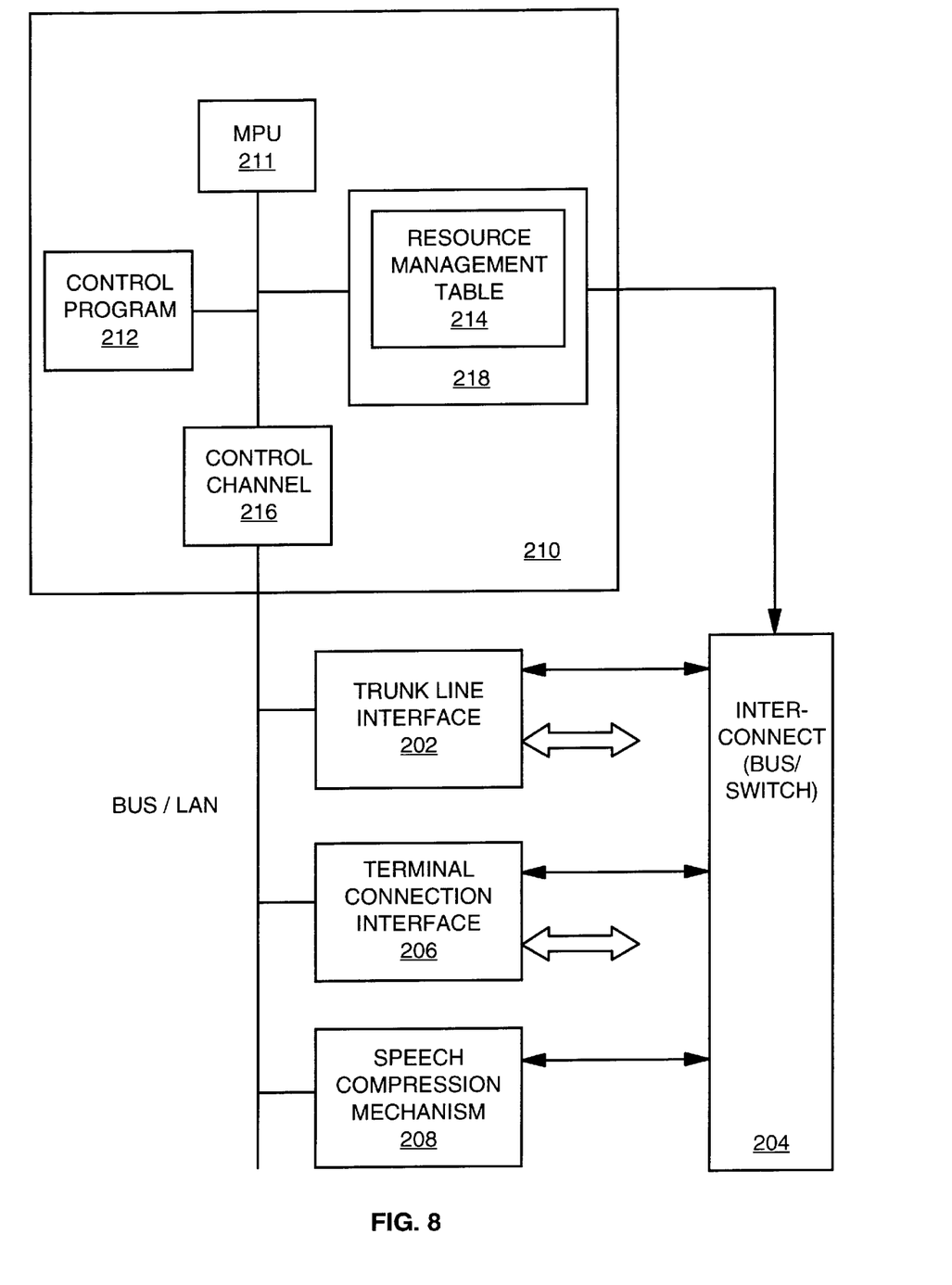
FIG. 8 is a block diagram illustrating a communication apparatus according to one embodiment of the present invention.

FIG. 8 is a block diagram illustrating one embodiment of a communication apparatus according to the present invention. A terminal connection interface (terminal I/F) 206 electrically connects the data terminal 14, the speech terminal 16, the FAX 18, etc., and performs the detection of the transmission of a call, the notification of the reception, the control of a data flow, and the detection of the disconnection of a call. This is replacement means with which it is easy for one having ordinary skill in the art to perform these operations by optical communication or by radio communication. An interconnect 204, which consists of a bus or a switch, can perform a one-to-one connection or a one-to-multiple connection in the first embodiment. A trunk line interface (trunk I/F) 202 controls a line that connects a communication apparatus 210. The time division multiplexer logically or physically multiplexes the connections between the terminals and carries them along a single trunk line.

Figure 11:
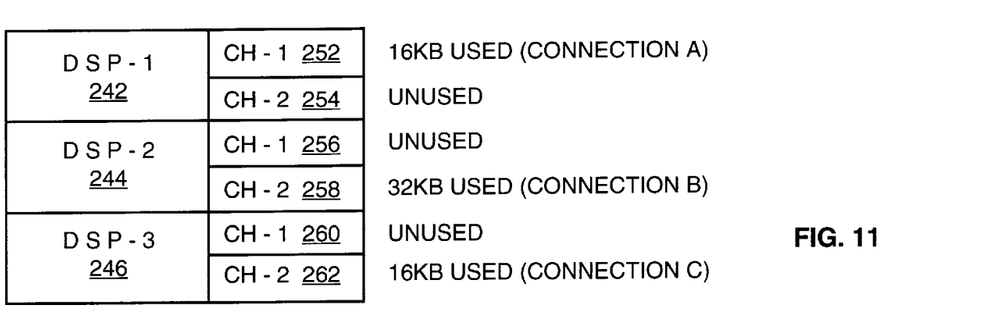
FIG. 11 is a block diagram illustrating one example speech compression mechanism according to the present invention.

A speech compression mechanism 208, which consists of a single or a plurality of signal processing units (DSPs), can handle the required number of speech channels and can select a speech compression method that is to be performed for each channel. The specific arrangement of the speech compression mechanism 208 is shown in FIG. 11. As is shown in FIG. 11, each DSP has a plurality of channels. In this table, a channel 252 of a DSP 242 is connected to a connection a, and compression is performed at a transfer speed of 16 Kb/s. A channel 256 of a DSP 244 is unused.

A resource management mechanism 210 allocates a resource of the speech compression mechanism 208 (DSP channel), a resource of a trunk line (trunk line band), and a resource of the interconnect 204 (interconnect band) in response to a request for connection of a speech call generated by a terminal connection interface. The resource management mechanism 210 completes the connection by defining, in a resource management table 212, the correlation between the resources as physical routes for connecting the call. Further, the resource management mechanism 210 exchanges the resource management information with a resource management mechanism in an opposing communication apparatus 214 and confirms the acquisition of a required resource. The resource management mechanism 210 is constituted by an MPU 211, a memory 218, a control channel 216, and a control program 212. The control program 212 is stored on a diskette, on a medium such as an MO or a CD-ROM, or on a hard disk drive, and can be loaded into the memory 218.

Figure 10:
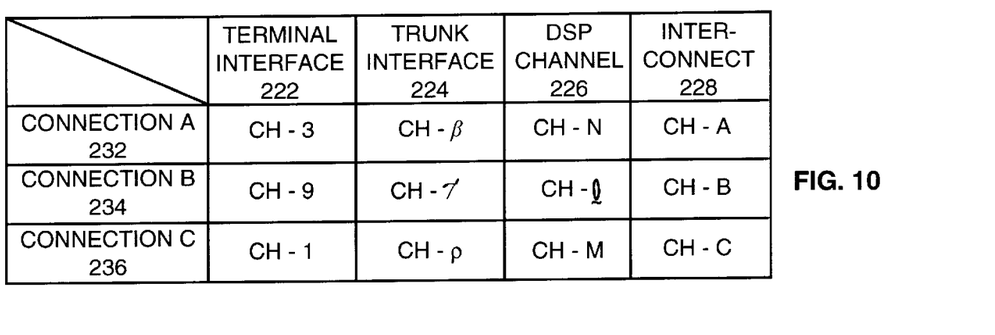
FIG. 10 is a block diagram illustrating one example resource management table according to the present invention.

The resource management table 212 is held in the memory 218. In FIG. 10 is shown the concept of the resource management table 212. The resource management table 212 manages, for each connection, channel information for the individual resources, such as a terminal interface 222, a trunk interface 224, a speech compression mechanism (DSP channel) 226 and an interconnect 228, that are employed for each channel. The connection resembles a pipe that a user has extended from one end to the other. The channel is a unit by which each resource is allocated to the connection. The resource management table can be constituted by using a hardware component, such as a switching means.

Figure 9:
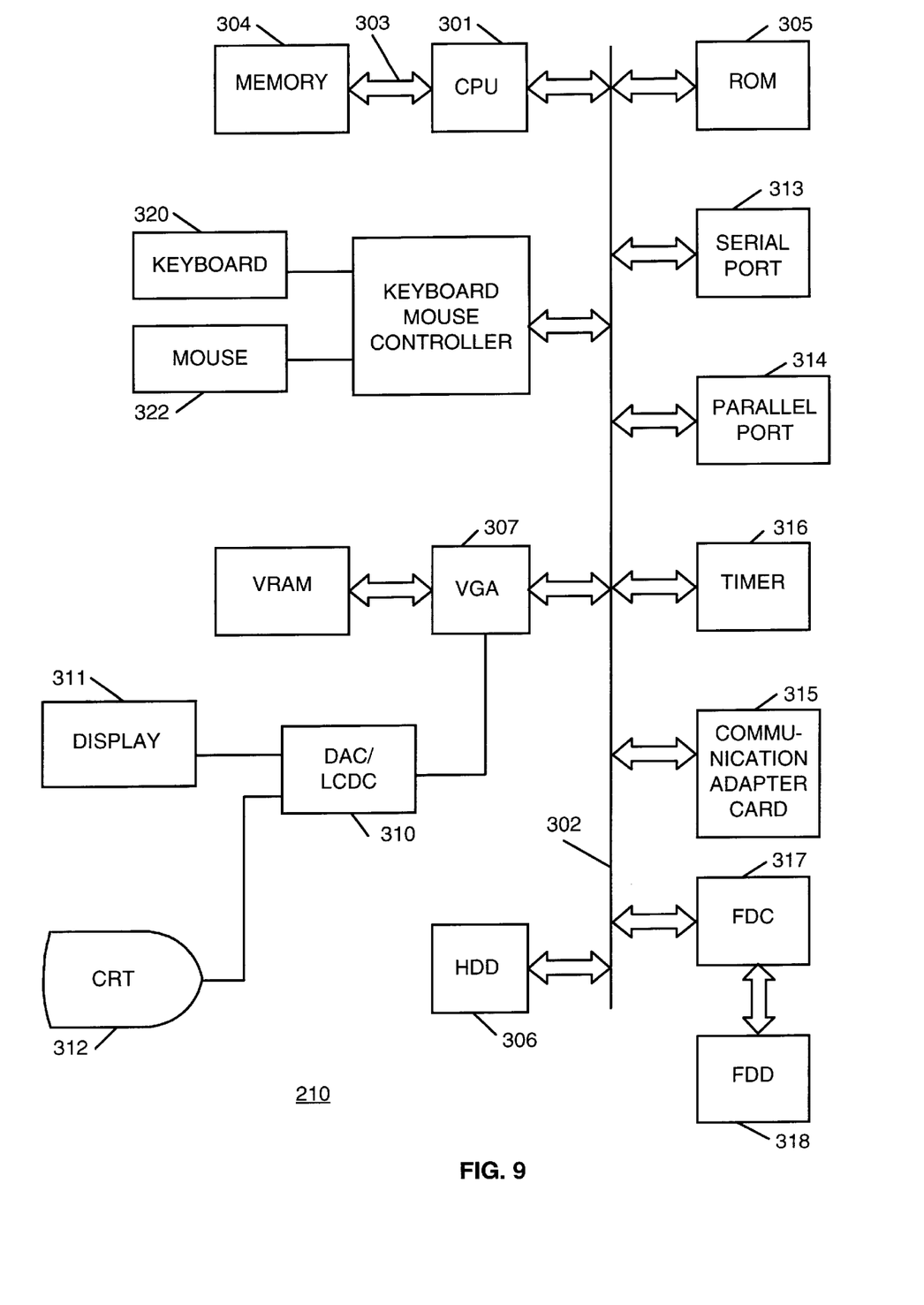
FIG. 9 is a block diagram illustrating one example resource management mechanism according to the present invention.

FIG. 9 is a block diagram illustrating the arrangement of the resource management mechanism 210 of the present invention. The resource management mechanism 210 comprises a central processing unit (CPU) 301 and a memory 304. The CPU 301 and the memory 304 communicate across a bus 302 with a hard disk drive 306, which serves as an auxiliary storage device. A diskette 318 is inserted into a floppy disk drive (a drive such as an MO or a CD-ROM) 317, and computer program code with which the communication system 100 carries out the present invention is recorded on the diskette (or on a medium such as an MO or a CD-ROM) 318 or on the hard disk drive 306. The resource management mechanism 210 may further comprise user interface hardware components, such as a pointing device (mouse) 322 or a keyboard 320 for data input, and a display 312 for visually providing data to a user. The resource management mechanism 210 can be replaced with a personal computer or a workstation.

Figure 12:
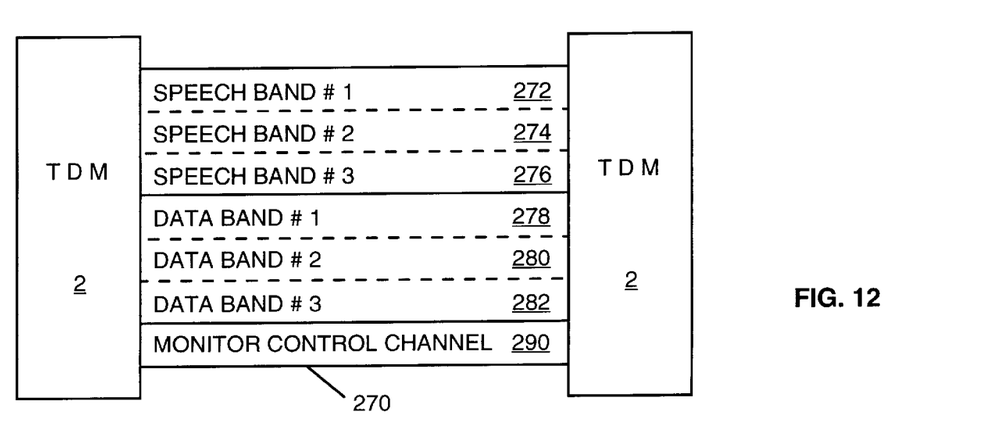
FIG. 12 is a conceptual diagram showing the assignment of bands between TDMs.
Figure 13:
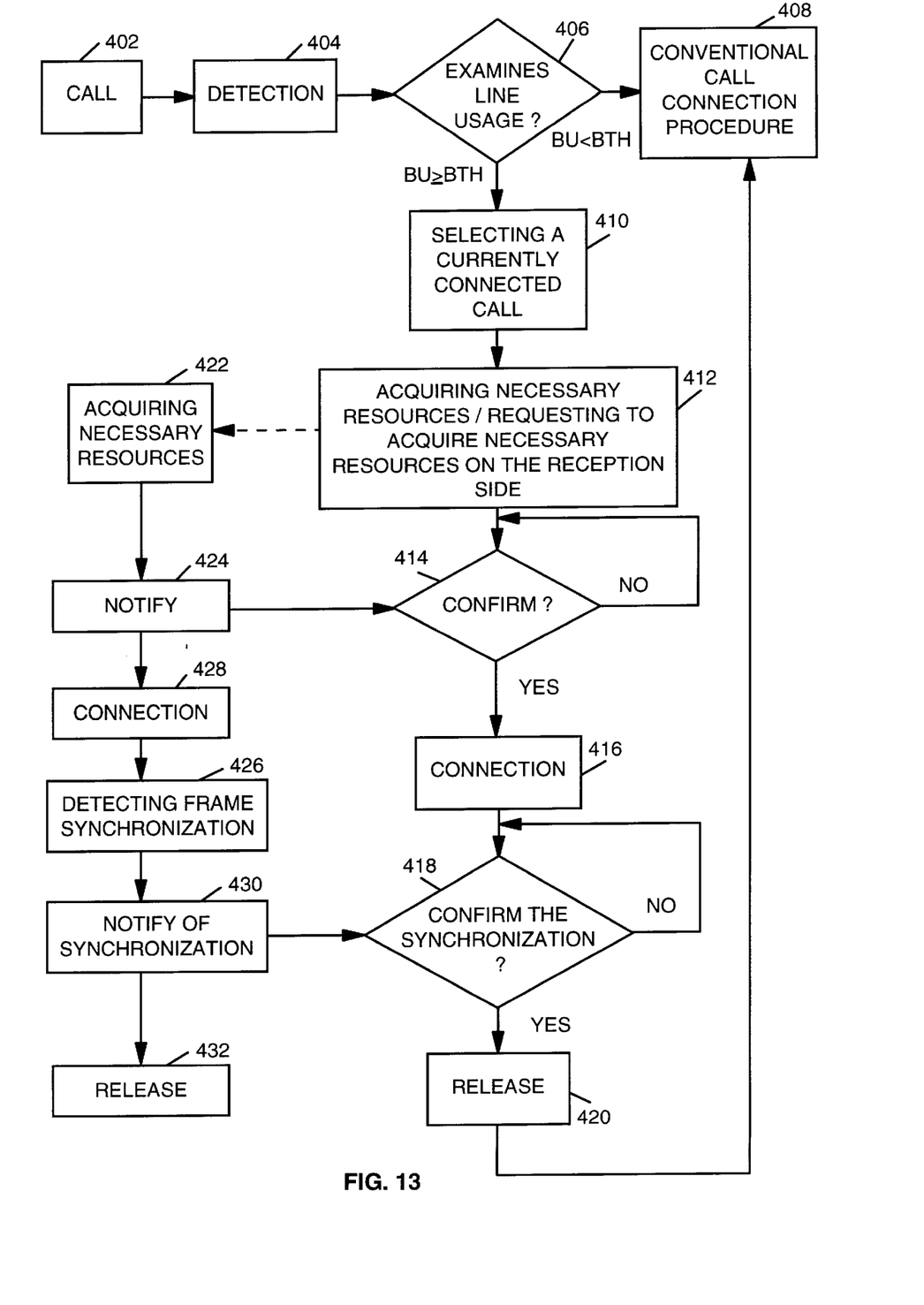
FIG. 13 is a flowchart showing one embodiment of the communication method of the present invention.

The preferred embodiment (a first embodiment) for a communication method according to the present invention will now be described while referring to FIG. 13. When a call is transmitted by a transmission side terminal (including the terminal device 14, the telephone set 16 or the FAX 18) (block 402), the terminal interface 206 on the transmission side notifies the resource management mechanism 210 of the detection of the transmission of a call (block 404). In response to this notice, the resource management mechanism 210 examines the line usage (Bu) to determine whether or not the compression system should be changed (block 406). The present invention can be operated under a condition wherein various types of data are dynamically allocated as is shown in FIG. 12, i.e., in an environment wherein as the amount of speech data is increased, the number of speech bands is increased and the number of data bands is reduced, and as the amount of general data is increased, the number of speech bands is reduced and the number of data bands is increased. In this case, a compression rate in a data band can be switched relative to the transmission of speech data, and a compression rate in a speech band can be switched relative to the transmission of general data. The switching of a compression rate can be determined by examining the total line usage for various types of data and by examining the line usage for a plurality of types of data that are designated.

Figure 2:
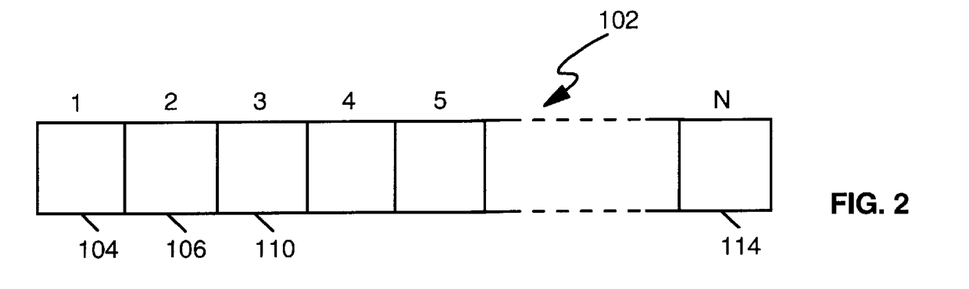
FIG. 2 is a conceptual diagram showing a conventional speech frame.

When a threshold value (Bth) is set for the number (Bu) of bands used on a trunk line, the relationship between the threshold value and the number of bands actually in use is employed as the condition for switching the speech compression method. An example switching condition will be explained while referring to FIGS. 2 through 5. In FIG. 2, since the transfer speed is 1.5 Mb/s according to special line service standard J1, the transfer of 24 channels by the PCM method is possible (1.5 Mb/s=1536 Kb/s; 1.5 Mb/s÷64 Kb/s=24). Similarly, by the ADPCM method, the transfer of 48 channels is possible (1.5 Mb/s÷32 Kb/s=48). Supposing that the threshold value is Bth=1.5 Mb/s−32 Kb/s=1,504 Kb/s, a compression system that requires a small band is used when the line usage is equal to or greater than the threshold value.

An extra band region in which a new call falls can be provided for a trunk line by changing to a lower band the band for a currently connected call. This procedure will be explained later. When it is ascertained that the switching of the speech compression method will not be performed, i.e., when the line usage is less than the threshold value (Bu<Bth), the call is connected to the reception side by means of a conventional call connection procedure (block 408). When it is ascertained that the switching of the speech compression method will be performed, i.e., when the line usage is equal to or greater than the threshold value (Bu Bth), a currently connected call for which the dynamic compression method is to be changed is selected (block 410).

The method for selecting a currently connected call, for which the dynamic compression method is to be changed, can be the selection of employing the time that elapses after the connection, i.e., the selection of an old call connected as a switching target (condition 1); or can be the selection by using a switching enabling attribute, i.e., the selection as a switching target a call for which is set a switching enabling attribute, which is provided for each call in advance (condition 2); or can be a combination of these two methods. As for the conditions 1 and 2, it is preferable for the selection priority be given to condition 2. The switching enabling attribute can be realized by providing an attribute for each terminal (call type) when a network is formed, and by registering in an attribute management table a flag indicating whether or not the switching is enabled. A plurality of bits are used for this flag, and for example, the bits are so set that "11" indicates compression is impossible, "10" indicates compression is enabled up to 32 Kb/s, "01" indicates compression is enabled up to 16 Kb/s, "00" indicates compression is enabled up to 8 Kb/s, and the absence of a corresponding terminal number in a table indicates all the compression methods are enabled. The compression enabling table can be set as follows, for example:

| Call type | Enabling attribute | Remarks |
| --- | --- | --- |
| 0001 | 01 | outside line 1 |
| 0003 | 11 | FAX 1 |
| 0055 | 10 | junction line 1 |
| 0066 | 00 | junction line 2 |

The enabling attribute is not just employed to examine the transmission side. The terminal number of the reception side is reported via a monitor control channel, etc. The resource management mechanism on the reception side checks the resource management table on the reception side, employs the terminal number on the reception side as a key to examine the enabling attribute of the reception side terminal, and notifies the transmission side resource management mechanism of the enabling attribute. Thus, the enabling attributes for both the transmission and the reception sides are employed as conditions to select a currently connected call for which a dynamic compression method is to be changed. More specifically, when the transmission side enabling attribute is "00" and the reception side enabling attribute is "01", these attributes are compared with each other, and the attribute having a greater value ("01" in this case) is selected as the condition. This value is compared with a current speech compression value in the resource management table. If the current speech compression value is 32 Kb/s (when the compression rate is to be changed to the rate for speech quality that is one level lower through the switching of a compression rate for the present invention), the condition 2 can be cleared. In other words, the condition is determined by using an inequality expression for the enabling attribute (16 kb/ s)<a current compression rate (32 kb/s), which is managed in the resource management table. With the attribute management method, a call that has a quality corresponds to the data contents to be transferred can be connected. The attribute enabling table can be present in the memory.

When the selection for a currently connected call that is a switching target (block 410) has been performed, the resource management mechanism 210 on the transmission side acquires necessary resources for a compression method to be changed, said resources including a DSP channel, a trunk band and an interconnect band (block 412).

When the compression switching method is a method for changing a current compression method to a compression method by which the next poorer speech quality is provided, i.e., when the PCM transfer system is to be changed to the ADPCM transfer system, or the ADPCM transfer system is to be changed to the LDCELP transfer system, or the LDCELP transfer system is to be changed to the VSELP system, it should be confirmed that there is a resource by which a call for a communication method to be obtained by switching can be connected.

This switching method can be employed as a method for changing a current compression method to a compression method by which speech quality is deteriorated by two levels. In this case, the PCM transfer system is changed to the LDCELP transfer system, and the ADPCM transfer system is changed to the VSELP transfer system. Further, by altering the control program for the resource management mechanism, it is possible to change all the PCM transfer system, the ADPCM transfer system and the LDCELP transfer system to the VSELP transfer system; to change the PCM transfer system and the ADPCM transfer system to the LDCELP transfer system; and to change the LDCELP transfer system to the VSELP transfer system. A method for converting all the transfer systems to the VSELP transfer system can enable the setting of the minimum threshold value (8 Kbps). Further, a user can be permitted to alter the control program for the resource management mechanism 210. According to a method for altering the program by a user, for example, the following table is prepared and a compression method is selected in consonance with the table.

| Currently connected call | First request | Second request |
|---|---|---|
| 11 | 10 | 01 |
| 10 | 01 | |

"11" stands for 64 Kb/s; "10", 32 Kb/s; "01", 16 Kb/s; "00", 8 Kb/s; and no registration, 8 Kb/s.

The second request in the table will be explained by referring to an item that was registered in the first line in the table. When the compression system of 64 Kb/s for a currently connected call is to be switched, a check is performed to determine whether or not it is possible to acquire a resource for newly connecting a call of 32 Kb/s. If so, a new call of 32 Kb/s is connected. If the resource can not be acquired, the resource management mechanism 210 determines whether or not it is possible to acquire a resource for newly connecting a call of 16 Kb/s. If the resource can be acquired, a new call of 16 Kb/s is connected.

Refer back to FIG. 13. When the resource can not be acquired, it is assumed that a call transmitted at block 402 is a call loss, and the process of the present invention for changing a compression rate is thereafter terminated. In parallel with the procedure at block 406 for checking the line usage, a call transmitted at block 402 can be compressed and the result can be connected. This procedure will be explained later. At the same time when the resource management mechanism 210 on the transmission side has acquired the resource, it requests that the reception side resource management mechanism acquire the resource (block 412). The control information is generally exchanged between the transmission side and the reception side across a monitor control channel (service channel).

Upon such a request, the resource management mechanism on the reception side attempts to acquire the resource (block 422). When the acquisition of the resource is successful, the reception side resource management mechanism notifies the transmission side that the resource has been successfully acquired. When the acquisition fails, the reception side notifies the transmission side to that effect (block 424). It is also valid for the acquisition of a resource to be performed again after a specific time elapses, or for the resource acquisition process to be repeated a predetermined number of times. In this case, the resource that is released after the communication across the other channels is completed can be effectively utilized. The transmission side, which receives a notice from the reception side, waits for a given time until a notice of acquisition is received (block 414). When a notice of acquisition has not been received after a given time elapsed, it is assumed that a call at block 402 is a loss, and the process of the present invention for changing the compression rate is thereafter terminated. Further, upon reception of the first notice for disabling the acquisition, the call at block 402 can be regarded as a loss. In addition, the receipt of the notice of resource acquisition can be repeatedly examined a specified number of times.

When, at block 414, the notice of resource acquisition from the reception side can be confirmed, the transmission side connects the call (block 416). In the first embodiment of the present invention, the transmission side interconnect performs a multicasting of speech data, which are transmitted from the terminal interface, for a currently connected resource and a newly acquired connected resource. In other words, the same data are communicated through two channels. On the transmission side, compression is performed along the DSP channel, and the compressed data are carried along the individual logical trunk lines.

On the other hand, the DSP channel, which serves as a newly connected resource on the reception side, performs synchronization of a frame wherein the compressed data are held (block 426). More specifically, the header portion or a trailer portion, or both portions, of a speech frame is examined to acquire synchronization. After synchronization is performed, data decompression is executed. Then, the connection process is performed on the reception side (block 428). Specifically, after the resource management mechanism on the reception side has confirmed the synchronization, or after the time required for a predetermined synchronization process has elapsed, the mechanism connects the DSP channel to the connection side interface card. When frame synchronization is detected by the reception side, the reception side notifies the transmission side to that effect indicating that the synchronization has been successful. When the synchronization fails, the reception side notifies the transmission side of the synchronization failure (block 430). In this case, if synchronization is not detected within a predetermined time, it is assumed that the time has expired, and a notice indicating that synchronization can not be acquired is transmitted.

When later the frame synchronization is detected by the reception side, the DSP channel that is used for the currently connected call is disconnected and released together with the resource on the trunk (block 432).

The transmission side, which receives a notice from the reception side, waits for a given time until a notice that the synchronization was successful is received (block 418). If the notice that the synchronization was successful is not received even after a specified time has elapsed, it is assumed that the time has expired, and a call at block 402 is regarded as a loss. The process of the present invention for switching a compression rate is thereafter terminated. Similarly, when the notice of a synchronization failure is received, a call at block 402 can be regarded as a loss. If synchronization is later acquired on the transmission side, a resource that becomes unnecessary, due to the switching of a dynamic compression system, is registered as an empty resource in the resource management table so that it can be assigned for a new call (block 420). Then, the resource management mechanism 210 assigns the resource for a pending call (block 408).

According to this method, a different connection is set for a currently connected call by a new compression system, and an old connection is cut off to release a resource that was used. When the compression system is to be changed, the occurrence of noise that affects speech communication can be avoided. It should be noted that since double connections are adopted temporarily, the interconnect is required for function of a one-to-multiple connection.

Figure 3:
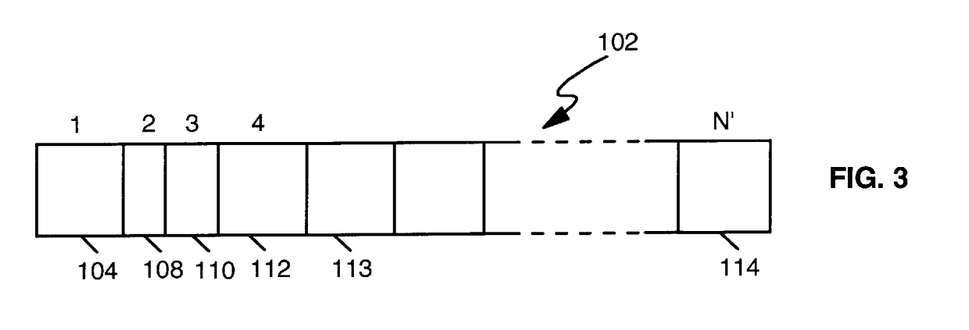
FIG. 3 is a conceptual diagram showing a speech frame for explaining the present invention.

The procedures of the present invention for switching a currently connected call to a compression system for which a required band is different will now be described while referring to FIGS. 2 through 4. In FIG. 2, suppose that a channel 106 is unused and that channels 104, and 110 through 114 are used. The communication capacity for each channel is 32 Kb/s, and the ADPCM compression system is employed for data transfer. In this condition, Bu=Bth=1,504 Kb/s, and when the next call occurs, according to the present invention, a currently connected call is changed to a compression method for which a required band is lower. The resource management mechanism 210 detects the state Bu=Bth, and selects a currently connected call, which is the switching target. The selected connected call is defined as a channel 104.

Figure 4:
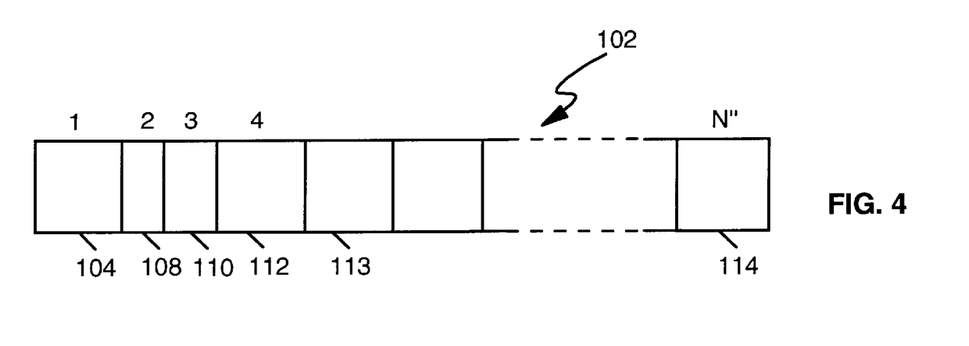
FIG. 4 is a conceptual diagram showing a speech frame for explaining the present invention.
Figure 5:
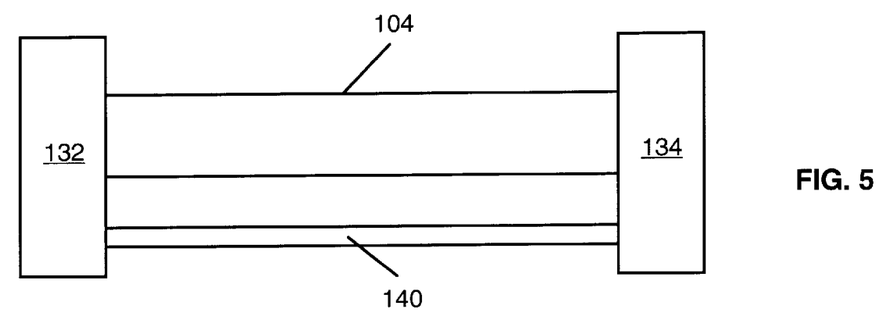
FIG. 5 is a conceptual diagram for explaining a communication method according to the present invention.
Figure 6:
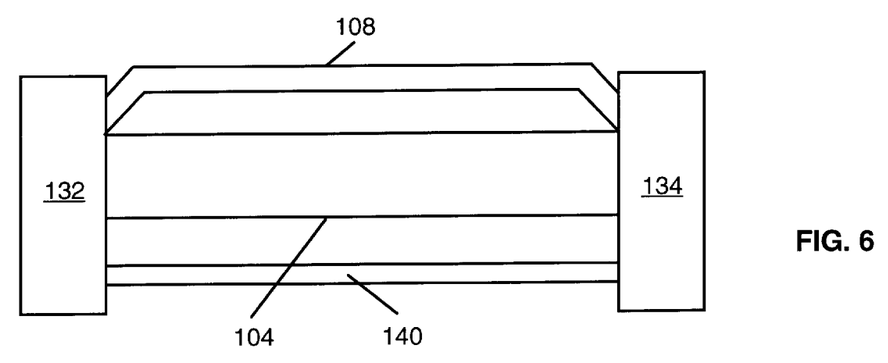
FIG. 6 is a conceptual diagram for explaining the communication method according to the present invention.
Figure 7:
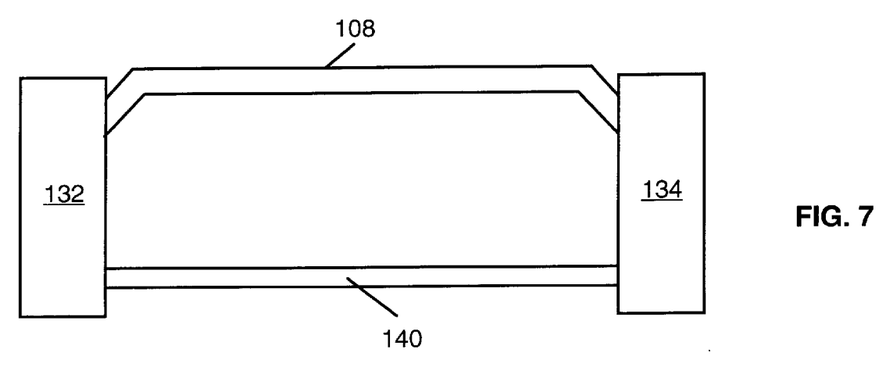
FIG. 7 is a conceptual diagram for explaining the communication method according to the present invention.

FIG. 5 is a conceptual diagram showing the communication state of the channel 104. In FIG. 5, a transmission side time division multiplexer 132 exchanges speech data with a reception side time division multiplexer 134 via the channel 104, and exchanges control information across a monitor control channel 140. Then, the transmission side resource management mechanism 210 acquires a resource required for a compression system for switching. Assuming that the channel 108 in FIG. 3 is acquired, the same data as were transmitted across the channel 104 are transmitted across this channel 108. FIG. 6 is a conceptual diagram showing this state. Then, when the synchronization of the frame to be transferred across the channel 108 is confirmed, the channel 104 is disconnected and the resource used for the channel 104 is released. FIG. 7 is a conceptual diagram showing this state. The channel 104 in FIG. 3 becomes empty and will be assigned for a new call. An explanation will be given, by referring to FIGS. 3 and 4, for another embodiment (a second embodiment) of the present invention for switching a compression system for which a higher quality is provided than that of a currently connected call. In FIG. 3, channels 104 and 112 are unused and channels 108, 110, 113 and 114 are being used. The communication capacity of the channels 108 and 110 is 16 Kb/s, and the LDCELP compression system is employed for data transfer. For the other channels, the ADPCM compression system (32 Kb/s) is employed for data transfer. The lower limit threshold value is set to Bth2=1,472 Kb/s (1.5 Mb/s=64 Kb/s). According to the second embodiment of the present invention, unlike the first embodiment wherein a call from the terminal is detected by the terminal interface to examine the line usage, it is preferable that a terminal interface detect the disconnection of a call and that the line usage be examined. When the line usage is examined, the obtained in use line value Bu is compared with the lower limit threshold value Bth2. When Bu<Bth2, i.e., when the line is lower than a predetermined value, the switching of a compression method, which is the second embodiment of the present invention, is performed. When it is determined that the switching is to be performed, a resource management mechanism 210 selects a currently connected call that is a switching target. The selected connected call is defined as the channel 108.

In FIG. 7 is shown the concept of the communication state for the channel 108. Then, the resource management mechanism 210 on either the transmission side or on the reception side acquires a resource that is needed for a compression method to be used. In the second embodiment, either the transmission side or the reception side can execute program control in the flowchart in FIG. 13. Since, at block 406, it can be confirmed that the line can be used by the connection of a call with a new compression method, the processes at blocks 410, 412, 414, 422 and 424 for acquiring resources for the transmission side and the reception side are not required.

Suppose that it is determined that a call with a new compression method is to be transferred across the channel 104 in FIG. 4. The same data as transmitted across the channel 108 are transmitted across the channel 104. The concept for this state is shown in FIG. 6. Then, when synchronization of the frames to be transferred across the channel 104 is confirmed, the channel 108 is disconnected, and the resource used for the channel 108 is released. This state is shown in FIG. 5. Thus, the channel 108 that is shown in FIG. 3 is unused, and will be assigned for a new call.

Figure 14:
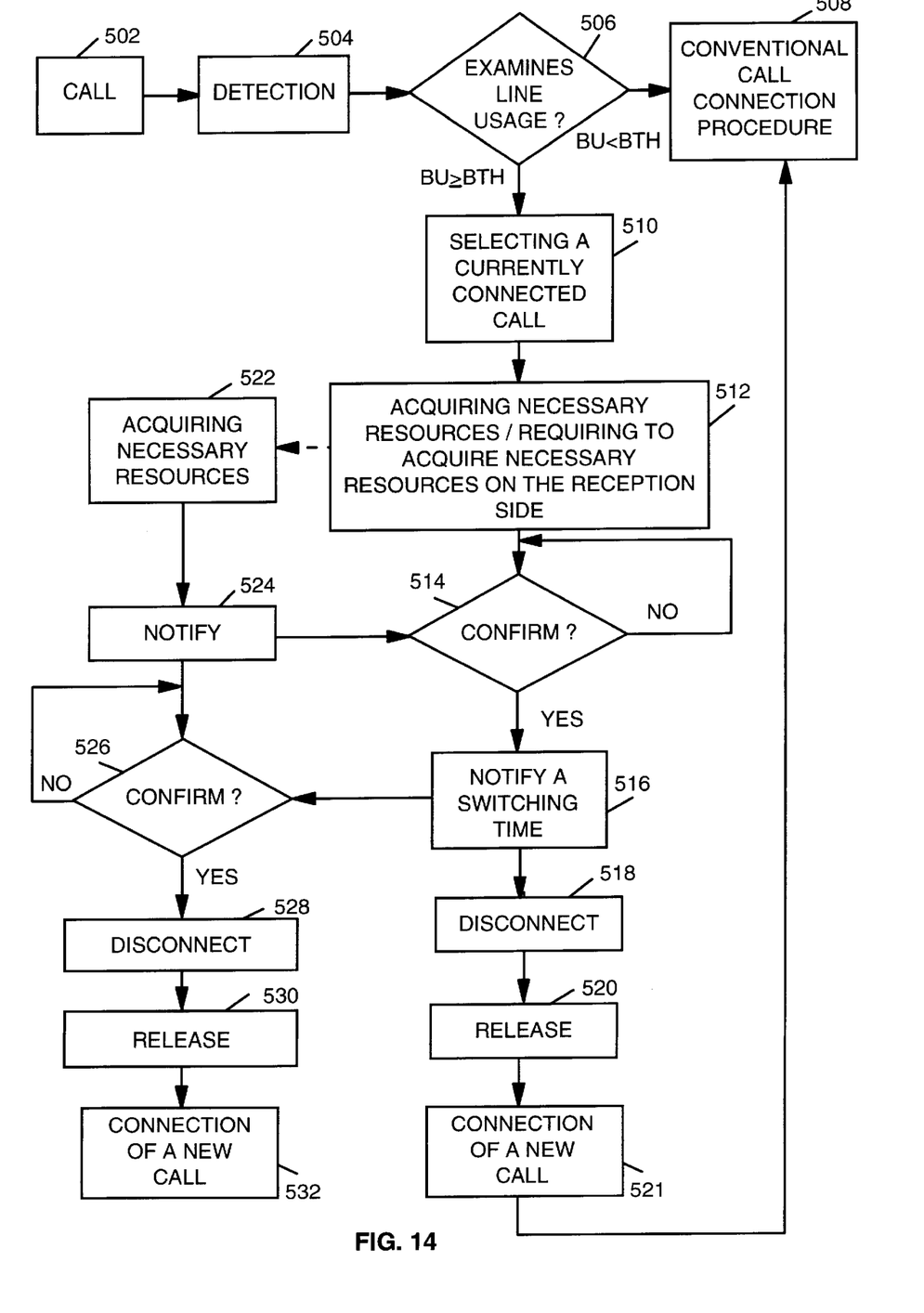
FIG. 14 is a flowchart showing another embodiment of the communication method of the present invention.

The preferred embodiment (a third embodiment) for a communication method according to the present invention will now be described while referring to FIG. 14. As well as in the first embodiment, when a call is transmitted by a transmission side terminal 14, a telephone set 16 or a FAX 18 (block 502), a terminal interface 206 on the transmission side notifies a resource management mechanism 210 of the detection of the transmission of a call (block 504). When it is ascertained that the switching of the speech compression method will be performed, i.e., when the line usage is equal to or greater than the threshold value (Bu Bth), a currently connected call for which the dynamic compression method is to be changed is selected (block 510). When the selection for a currently connected call that is a switching target has been performed, the resource management mechanism 210 on the transmission side acquires the necessary resources for a compression method to be obtained by switching (block 512). When the resources can not be acquired, the process as in the first embodiment is performed. And in the same manner as in the first embodiment, the resource management mechanism 210 requests the reception side resource management mechanism to acquire the resource (block 512). Upon such a request, the resource management mechanism on the reception side attempts to acquire the resource (block 522). When the acquisition of the resource is successful, the reception side resource management mechanism notifies the transmission side that the acquisition of the resource was successful. When the acquisition fails, the reception side notifies the transmission side to that effect (block 524).

If, at block 514, the transmission side acknowledges a notice from the reception side for the acquisition of a resource, the transmission side notifies the reception side of a switching time (block 516). The reception side acknowledges this notification. If the reception side does not receive this notification, a call at block 502 can be regarded as a loss (block 526). When the transmission side has notified the reception side of the switching time, the transmission side disconnects a currently connected call (block 518), releases the resource that was used for the currently connected call (block 520), and performs the connection of a call with a new compression system (block 521). In other words, the transmission side transfers, at the interconnect, only a new connected resource acquired for speech data from the terminal interface. On the transmission side, compression is performed at the DSP channel and the resultant data are carried along the logical trunk lines. While the first embodiment of the present invention requires a one-to-one connection and a one-to-multiple connection, the second embodiment of the present invention does not require a one-to-multiple connection.

During a series of processing procedures for the disconnection of a currently connected call from the transmission side and the reception side, for the releasing of a resource that is employed for a currently connected call, and for the connection of a call with a new compression method, if a time difference occurs at the time of switching, noise will occur and will cause deterioration of the speech quality. It is preferable that such a time difference falls within a period where it does not affect speech. Therefore, according to a third embodiment of the present invention, real time clocks on the transmission side and on the reception side are utilized to perform switching within a designated time.

In the following description for the third embodiment of the present invention that is provided after enhancement, assume that the time required for a switching process and a latency required for activation are well known and are taken into consideration for time calculation. It is preferable that a synchronization error be 10 ms or smaller to provide a time period that does not affect speech quality during communication.

In order to switch a call on the transmission side and on the reception side at the same time, a line delay between the transmission side and the reception side, and a real time clock difference between the two sides must be calculated. The line delay between the transmission side and the reception side is acquired by transmitting a delay measurement packet to an adjacent node that is loop-back connected and measuring the time that is required for the packet to be returned, and then performing a calculation to obtain a time value that is ½ the measured time, i.e., the required one way travel time (time Tld). For the real time clock difference between the transmission side and the reception side, the transmission side uses a time difference measurement packet to notify the reception side, or vice versa, of the time held by a real time clock (Tr) in its own node and the time Tld. The reception node compares the real time clock time in its node with Tr+Tld, and calculates the time difference (Ts). The reception node then returns Ts to the requesting node.

A connection entity that receives a notice for alteration of a compression method employs the switching absolute time (Tcs), i.e., the real time clock on the transmission side, to determine an absolute time to perform switching, and transmits an absolute switching time to its partner by using a switching request packet. The above described procedures are for confirming a time difference between the transmission side and the reception side in order for them to perform switching at the same time, and many other replacement procedures are available that could easily be provided by one having ordinary skill in the art. For example, before the method of the present invention is to be performed, a time difference for both sides is confirmed and stored in advance, and switching is performed based on the stored value. Or, instead of the transmission side, the reception side calculates the time difference between the two.

When the reception side has received the notification of the absolute switching time, it disconnects a currently connected call (block 528), opens a resource employed for the currently connected call (block 530), and performs the connection for a call with another compression method (block 532). In this case, the process at blocks 518 and 528 for the disconnection of a currently connected call, the process at blocks 520 and 530 for the release of a resource for a currently connected call, and the process at blocks 521 and 532 for the connection of a call with another compression system may be performed at random. When the process for the connection of a call with another compression system is performed following the disconnection of a currently connected call and the release of a resource for the currently connected call, the resource released from the currently connected call can be used for connecting a call with another compression system, so that the process at blocks 510, 512, 514, 522 and 524 for acquiring a resource on the transmission side and the reception side is not required (when a compression system is switched to one for which speech quality is poorer). However, in the case wherein the process for the connection of a call with another compression system is performed following the disconnection of a currently connected call and the release of a resource for the currently connected call, too much is required from the time the currently connected call is disconnected until it is re-connected, and this will affect the communication speech quality. A new call that has occurred at block 502 may be connected immediately after the occurrence of a call is detected at block 504, or may be connected following the completion of the conventional call connection procedure at block 508.

As is described above, according to the present invention, in a synchronous multiplexer or an asynchronous multiplexer (which includes a multiplexer having an exchange function), since a compression system can be dynamically selected or changed by referring to a band use rate for a trunk line, the line can be effectively used and call losses can be reduced. More specifically, when a line is to be set, an optimal compression method is determined while obtaining the unused capacity for a trunk line, and a required band is acquired. Further, even when the trunk line is no longer empty, a line can be acquired for a call request, and the occurrence of a call loss can be prevented. In addition, taking into consideration both the in use condition of a line and the contents of the data to be transferred, a call having an adequate quality can be connected.

What is claimed is:

1. A communication method implemented in a communication system having a first time division multiplexer (TDM) and a second TDM connecting a plurality of terminals, wherein each of said first TDM and said second TDM has a voice compression means and a resource management table managing a DSP channel, a trunk band, and an interconnect band as resources required for connecting said first TDM and said second TDM with at least two different compression rates on a line, said communication method comprising the steps of:

(a) detecting a new call transmitted from a terminal that is connected to said first TDM;

(b) checking current line usage of said line;

(c) selecting a first call that is currently connected with said first compression rate at said second TDM, when said current line usage meets a predetermined condition;

(d) examining said resource management table of said first TDM to determine whether it is possible to acquire said DSP channel, said trunk band, and said interconnect band as required resources, which are required for additionally connecting a second call with a second compression rate;

(e) transmitting, to said second TDM, a resource acquisition request in order to connect said second call at said second compression rate;

(f) determining whether a resource acquisition notice from said second TDM is detected;

(g) connecting said second call at said second compression rate, when it is possible to acquire said resources on said first TDM and said resource acquisition notice is detected;

(h) communication the same data as that of said first call on said second call;

(i) establishing synchronization between said first TDM and said second TDM for said second call with said second compression rate; and (j) disconnecting said first call and releasing resources that are used for said first call.

2. The communication method, according to claim 1, where said first TDM and said second TDM allocate a speech band for performing speech communication, a data band for performing data communication, and a monitor control channel for performing communication of control information with another TDM on said line, wherein said step (b) of checking current line usage further comprises checking current data band usage, and wherein said first call is selected among calls connected currently on said speech band.

3. A method for communication utilizing at least two different compression rate calls on a line between a first communication apparatus and a second communication apparatus, said method comprising the steps of:

(a) inspecting current line usage of said line;

(b) selecting a first call connected with a first compression rate on said line, when a current line usage falls within a predetermined range;

(c) checking whether a second call with a second compression rate is able to connect between the first communication apparatus and the second communication apparatus, wherein said second compression rate is different from said first compression rate;

(d) connecting said second call with said second compression rate, if said second call is able to connect between the first communication apparatus and the second communication apparatus;

(e) communicating, in said second call, data from said first call; and (f) disconnecting said first call.

4. The communication method, according to claim 3, wherein said second compression rate is a compression rate that requires a wider band range than that of said first compression rate, when said current line usage is smaller than a first threshold, and is a compression rate that requires a narrower band range than that of said first compression rate, when said current line usage is greater than a second threshold that is greater than said first threshold.

5. The communication method, according to claim 3, wherein said step (b) of selecting a first call comprises checking whether an attribute of said first call admits said second compression rate.

6. A communication system having a first TDM and a second TDM connecting a plurality of terminals, wherein each of said first TDM and said second TDM has a voice compression means and a resource management table managing a DSP channel, a trunk band, and an interconnect band as resources required for connecting said first TDM and said second TDM with at least two different compression rates on a line, said communication system comprising:

(a) a terminal interface for detecting a new call transmitted from a terminal that is connected to said first TDM or said second TDM; and (b) a resource management means including:

means for checking current line usage of said line;

means for selecting a first call that is connected with the first compression rate on said line, when said current line usage meets predetermined range;

means for examining said resource management table of said first TDM to determine whether it is possible to acquire said DSP channel, said trunk band, and said interconnect band as required resources, which are required for additionally connecting a second call with a second compression rate;

means for transmitting, to said second TDM, a resource acquisition request in order to connect said second call at said second compression rate;

means for determining whether a resource acquisition notice from said second TDM is detected;

means for connecting said second call at said second compression rate, when it is possible to acquire said resources on said first TDM and said resource acquisition notice is detected;

means for communicating the same data s that of said first call on said second call;

means for establishing synchronization between said first TDM and said second TDM for said second call with said second compression rate; and means for disconnecting said first call and releasing resources that are used for said first call.

7. The communication system, according to claim 6, wherein said first TDM and said second TDM allocate a speech band for performing speech communication, a data band for performing data communication, and monitor control channel for performing communication of control information with another TDM on said line, wherein said means for checking current line usage further checks current data band usage, and said first call is selected among calls connected currently on said speech band.

8. A communicating apparatus for communicating with at least two different compression rate calls on a line connected to an another communication apparatus, said communication apparatus comprising:

(a) means for inspecting current line usage of said line;

(b) means for selecting a first call connected with a first compression rate on said line, when said current line usage meets predetermined range;

(c) means for checking whether a second call with a second compression rate is able to connect on said line, wherein said second compression rate is a different rate from said first compression rate;

(d) means for connecting said second call with said second compression rate, when said second call is checked to be able to connect;

(e) means for communicating, on said second call, data from said first call; and (f) means for disconnecting said first call.

9. The communication apparatus, according to claim 8, wherein said second compression rate is a compression rate that requires a wider band range than that of said first compression rate, when said current line usage is less than a first threshold, and is decided to be a compression rate that requires a narrower band range than that of said first compression rate, when said current line usage is greater than a second threshold that is greater than said first threshold.

10. The communication apparatus, according to claim 8, wherein said selecting means (b) comprises means for checking whether an attribute of said first call admits said second compression rate.

11. A communicating apparatus for communicating with at least two different compression rates on a line connected to an another communication apparatus, wherein said communication apparatus is communicating with said another communication apparatus by a first call on said line with a first compression rate, said communication apparatus comprising:

(a) means for inspecting a resource acquisition request from said another communication apparatus, wherein said resource acquisition request is sent for connecting a second call at second compression rate that is different from said first compression rate on said line;

(b) means for checking, in response to said resource acquisition request from said another communication apparatus, whether said second call with said second compression rate is able to connect on said line;

(c) means for sending a resource acquisition notice to said another communication apparatus, if said second call is able to connect;

(d) means for connecting said second call with said second compression rate; and (e) means for communicating, on said second call, data from said first call.

12. A communicating apparatus for communicating with at least two different compression rates on a line connected to an another communication apparatus, said communication apparatus comprising:

(a) means for inspecting current line usage of said line;

(b) means for selecting a first call connected with a first compression rate on said line, when said current line usage falls within a predetermined range;

(c) means for sending a change request signal to said another communication apparatus, wherein said change request is sent for requesting said another communication apparatus to change said first compression rate of said first call to a second compression rate that is different from said first compression rate;

(d) means for disconnecting said first call;

(e) means for connecting a second call at said second compression rate; and wherein said disconnection of said first call and said connection of said second call is performed with a time difference based on a line delay between said communication apparatus and said another communication apparatus and a real time clock difference between said communication apparatus and said another communication apparatus.

* * * * *